United States Patent
Yang (10) Patent No.: US 10,609,618 B2
(45) Date of Patent: Mar. 31, 2020

(54) TERMINAL AND PROCESSING METHOD AFTER ACCESS FAILURE OF TERMINAL

(71) Applicant: HUAWEI TECHNOLOGIES CO., LTD., Shenzhen (CN)

(72) Inventor: Xiaodong Yang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/300,626

(22) Filed: Jun. 10, 2014

(65) Prior Publication Data
US 2014/0287756 A1  Sep. 25, 2014

Related U.S. Application Data

(63) Continuation of application No. PCT/CN2012/079594, filed on Aug. 2, 2012.

(51) Int. Cl.
*H04W 36/34* (2009.01)
*H04W 48/16* (2009.01)
*H04W 48/18* (2009.01)

(52) U.S. Cl.
CPC .......... *H04W 36/34* (2013.01); *H04W 48/16* (2013.01); *H04W 48/18* (2013.01)

(58) Field of Classification Search
USPC ................................................ 455/423–425
See application file for complete search history.

(56) References Cited

U.S. PATENT DOCUMENTS

| | | |
|---|---|---|
| 2006/0040700 A1 | 2/2006 | Roberts et al. |
| 2010/0317352 A1 | 12/2010 | Nakata |
| 2011/0028143 A1 | 2/2011 | Johansson et al. |
| 2011/0269426 A1* | 11/2011 | Hultin ........... H04W 12/10 455/411 |
| 2012/0003958 A1 | 1/2012 | Hossain et al. |
| 2012/0108199 A1* | 5/2012 | Wang ............. H04W 76/10 455/405 |

(Continued)

FOREIGN PATENT DOCUMENTS

| | | |
|---|---|---|
| CN | 1829380 A | 9/2006 |
| CN | 101056455 A | 10/2007 |

(Continued)

OTHER PUBLICATIONS

Pages 1 and 22-25 of 3GPP TSG RAN WG2 #77bis (Mar. 26 to 30, 2012).*

(Continued)

*Primary Examiner* — Steven S Kelley
(74) *Attorney, Agent, or Firm* — Slater Matsil, LLP (57) ABSTRACT

Various embodiments of the present invention provide a terminal and a processing method after an access failure of the terminal. The method includes: establishing, by a terminal, an RRC connection with a first cell, where the first cell is a cell containing a PLMN selected by the terminal; and logging, by the terminal, an access failure PLMN list when the terminal fails to establish the RRC connection with the first cell, where the access failure PLMN list includes the PLMN selected by the terminal. According to the embodiments of the present invention, the accuracy of the logging may be achieved, thereby reporting to a correct PLMN.

5 Claims, 4 Drawing Sheets

(56) References Cited

U.S. PATENT DOCUMENTS

| | | | | |
|---|---|---|---|---|
| 2012/0155390 | A1* | 6/2012 | Ou | H04W 24/10 370/328 |
| 2012/0157095 | A1* | 6/2012 | Fodor | H04W 4/08 455/434 |
| 2013/0040634 | A1* | 2/2013 | Johansson | H04W 24/10 455/422.1 |
| 2013/0109320 | A1* | 5/2013 | Tomala et al. | 455/67.11 |
| 2013/0183978 | A1* | 7/2013 | Keskitalo | H04W 24/10 455/436 |
| 2013/0183982 | A1* | 7/2013 | Martin | H04W 36/0061 455/437 |
| 2013/0272139 | A1* | 10/2013 | Guo | H04W 76/18 370/242 |
| 2014/0051428 | A1* | 2/2014 | Jung et al. | 455/422.1 |
| 2014/0099940 | A1* | 4/2014 | Kim et al. | 455/422.1 |
| 2014/0128057 | A1* | 5/2014 | Siomina et al. | 455/423 |
| 2014/0295840 | A1* | 10/2014 | Keskitalo | H04W 36/0061 455/436 |

FOREIGN PATENT DOCUMENTS

| | | |
|---|---|---|
| CN | 101547242 A | 9/2009 |
| CN | 101861753 A1 | 10/2010 |
| CN | 101986751 A | 3/2011 |
| CN | 102083092 A | 6/2011 |
| CN | 102348221 A | 2/2012 |
| EP | 2214427 A1 | 8/2010 |
| GB | 2 434 507 A | 7/2007 |
| JP | 2009-524972 | 7/2009 |
| JP | 2011-527136 | 10/2011 |
| WO | 2006043131 A1 | 4/2006 |
| WO | WO 2010/002317 A1 | 1/2010 |
| WO | WO 2010/062786 A1 | 6/2010 |
| WO | WO 2011/088170 A1 | 7/2011 |

OTHER PUBLICATIONS

"$3^{rd}$ Generation Partnership Project; Technical Specification Group Radio Access Network; Radio Resource Control (RRC); Protocol specification (Release 11)" 3GPP TS 25.331 v11.2.0 (201-06) Valbonne, France, pp. 1-1943.
"$3^{rd}$ Generation Partnership Project; Technical Specification Group Radio Access Network; Evolved Universal Terrestrial Radio Access (E-UTRA); Radio Resource Control (RRC); Protocol specification (Release 11)" 3GGP TS 36.331 v11.0.0 (Jun. 2012), Valbonne, France, pp. 1-302.
$3^{rd}$ Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11) 3GPP TS 37.320 v11.0.0 (Jun. 2012) Valbonne, France, pp. 1-20.
International Search Report dated May 9, 1013 in corresponding Chinese Patent Application No. PCT/CN2012/079594.
International Search Report dated May 9, 2013 in corresponding International Patent Application No. PCT/CN2012/079594.
Extended European Search Report dated Apr. 23, 2014 in corresponding European Patent Application No. 12882293.9.
"Remaining issue for accessibility", R2-122457, Huawei, HiSilicon, 3GPP TSG-RAN WG2 Meeting #78, Prague, Czech Republic, May 21-25, 2012.
"MDT Accessibility Measurement for UMTS" R2-122476, Huawei, HiSilicon, 3GPP TSG-RAN WG2 #78, Prague, Czech Republic, May 21-25, 2012.
Chinese Office Action dated Jun. 2, 2015 in corresponding Chinese Patent Application No. 2014-547678.
Samsung, "PLMN Consideration for RLF Reporting", 3GPP TSG-RAN WG2 #72, Nov. 15-Nov. 19, 2010, Jacksonville, pp. 2-7.
Nokia Siemens, Network, Nokia Corporation, CATT, LG Electronics Inc., MediaTek, TeliaSonera, "RLF reporting across PLMNs", 3GPP TSG-RAN WG2 Meeting #77bis, Jeju, South Korea, Mar. 26-30, 2012, pp. 2-3.
Japanese Office Action dated Mar. 14, 2016 in corresponding Japanese Patent Application No. 2014-547678.
Chinese Notice of Allowance dated Jun. 29, 2017 in corresponding Chinese Patent Application No. 201280001744.4.
"Introduction of MDT enhancements—remaining parts," $3^{rd}$ Generation Partnership Project, 3GPP TSG-RAN WG2 Meeting #78, Prague, Czech Republic, May 21-25, 2012, R2-123098.
"Introduction of MDT enhancement multi-PLMN RLF Report," $3^{rd}$ Generation Partnership Project, 3GPP TSG-RAN WG2 Meeting #78, Prague, Czech Republic, May 21-25, 2012, R2-123099.
Chinese Office Action dated Nov. 1, 2016 in corresponding Chinese Patent Application No. 201280001744.4.
Office Action, dated Dec. 31, 2018, in Brazilian Application No. 112014017206-4 (7 pp.).
"Applicability of ePLMN to RLF Reporting," Source: Alcatel-Lucent, Agenda Item: 6.7, Document for: Discussion, TSG-RAN WG2#75, R2-114302, Athens, Greece, Aug. 22-26, 2011, 11 pages.

* cited by examiner

TERMINAL AND PROCESSING METHOD AFTER ACCESS FAILURE OF TERMINAL

CROSS-REFERENCE TO RELATED APPLICATION

This application is a continuation of International Application No. PCT/CN2012/079594, filed on Aug. 2, 2012, which is hereby incorporated reference in its entity.

TECHNICAL FIELD

Various embodiments of the present invention relate to wireless communications technologies, and in particular, to a terminal and a processing method after an access failure of the terminal.

BACKGROUND

Minimization of drive tests (Minimization of Drive Tests, MDT) is classified into immediate MDT (immediate MDT) and logged MDT (logged MDT). In a logged MDT solution, a network side performs MDT configuration on a user equipment (User Equipment, UE) when the radio resource control (Radio Resource Control, RRC) is in a connected status; when the UE turns to an idle (idle) status, the UE performs MDT measurement and logging, and reports a logged MDT measurement result to the network side when the UE turns to the connected status. The reporting process is usually as follows: first, the UE reports indication information to the network side to indicate that the UE has logged MDT log data; second, when the network side needs to trigger the UE to report the MDT log data, the network side sends a request message to the UE; finally, after receiving the request message, the UE reports the logged MDT log data to the network side.

When the UE traverses public land mobile networks (Public Land Mobile Network, PLMN), before the UE reports the indication information described above or reports the MDT log data, the UE needs to determine whether a current registration PLMN (Registration PLMN, RPLMN) is the same as an MDT PLMN, where the MDT PLMN is the RPLMN of the UE when the MDT is configured; only when the current registration PLMN is the same as the MDT PLMN, the above reporting may be performed.

In another scenario, when a radio link failure (Radio Link Failure, RLF) or handover failure (Handover Failure, HOF) occurs on the UE, the UE logs an RLF or HOF report, and logs the RPLMN when the RLF or HOF occurs. In this scenario, the reporting process of the UE is usually as follows: first, the UE reports indication information to the network side to indicate that the UE has logged the RLF or HOF report; second, when the network side needs to trigger the UE to report the RLF or HOF report, the network side sends a request message to the UE; finally, after receiving the request message, the UE reports the logged RLF or HOF report to the network side. Similar to a logged MDT scenario, before reporting the indication information or submitting the report, the UE needs to determine whether the current RPLMN is the same as the RPLMN when the occurrence of the RLF or HOF is logged; and only when they are the same, the above reporting may be performed.

As seen from the above description, what is logged by the UE in the prior art is the RPLMN; however, when the UE fails to access a PLMN, a logging error or a reporting error occurs if what is logged is still the RPLMN. For example, assuming that the UE camps on a cell of a PLMN1 in the beginning and the RPLMN=PLMN1, after the UE moves from the PLMN1 to a PLMN2, the UE attempts to establish an RRC connection with a cell of the PLMN2; at this time, if the RRC connection fails to be established, the UE cannot access the PLMN2. At this time, because the UE does not access the PLMN2, the RPLMN of the UE cannot be updated and is still the PLMN1; if the UE still logs the RPLMN of the UE when the failure occurs, the PLMN1 is logged as a PLMN with a failed access and a report logging the failed access is still reported to the PLMN1; obviously, a logging error occurs and the cell of the wrong PLMN is reported to.

SUMMARY

Accordingly, various embodiments of the present invention provide a terminal and a processing method after an access failure of the terminal, so as to solve the problem of a logging error usually caused by logging of an RPLMN in the prior art.

In one aspect, a processing method after an access failure of a terminal is provided, where the method includes:

establishing, by a terminal, an RRC connection with a first cell, where the first cell is a cell including a PLMN selected by the terminal; and logging an access failure PLMN list when the terminal fails to establish the RRC connection with the first cell, where the access failure PLMN list includes the PLMN selected by the terminal.

In a possible implementation manner, the access failure PLMN list further includes:

a first EPLMN corresponding to the PLMN selected by the terminal, where the first EPLMN is an EPLMN of the PLMN selected by the terminal before the RRC connection fails to be established; or a second EPLMN corresponding to the PLMN selected by the terminal, where the second EPLMN is an EPLMN of the PLMN selected by the terminal undergoing an EPLMN update after the terminal successfully accesses the first cell again.

In another possible implementation manner, the access failure PLMN list merely includes the PLMN selected by the terminal, and the method further includes: obtaining, by the terminal, indication information, where the indication information is used to indicate that the PLMN selected by the terminal is logged when an access failure occurs; and the logging the access failure PLMN list includes: logging, according to the indication information, the PLMN selected by the terminal in the access failure PLMN list.

In another possible implementation manner, the method further includes:

determining, by the terminal, whether the logged access failure PLMN list includes an RPLMN of the terminal when the terminal accesses a second cell, and if yes, reporting indication information that indicates logged data is available or a logging report to the second cell; or determining, by the terminal, whether the logged access failure PLMN list includes an identifier of a PPLMN of a second cell, and if yes, reporting indication information that indicates the logged data is available or a logging report to the second cell; or determining, by the terminal, whether the logged access failure PLMN list is the same as any item of a PLMN list broadcast by a second cell, and if yes, reporting indication information that indicates the logged data is available or a logging report to the second cell.

The second cell is a cell with which the terminal has established an RRC connection or a cell to which the terminal has been handed over.

In another aspect, a terminal is provided, where the terminal includes:

an establishment module, configured to establish an RRC connection with a first cell, where the first cell is a cell including a PLMN selected by the terminal; and a logging module, configured to log an access failure PLMN list when the RRC connection with the first cell fails to be established, where the access failure PLMN list includes the PLMN selected by the terminal.

In a possible implementation manner, the access failure list logged by the logging module further includes:

a first EPLMN corresponding to the PLMN selected by the terminal, where the first EPLMN is an EPLMN of the PLMN selected by the terminal before the RRC connection fails to be established; or a second EPLMN corresponding to the PLMN selected by the terminal, where the second EPLMN is an EPLMN of the PLMN selected by the terminal undergoing an EPLMN update after the terminal successfully accessing the first cell again.

In another possible implementation manner, the access failure PLMN list merely includes the PLMN selected by the terminal, and the terminal further includes an obtaining module, configured to obtain indication information, where the indication information is used to indicate that the PLMN selected by the terminal is logged when an access failure occurs; and the logging module is specifically configured to log, according to the indication information, the PLMN selected by the terminal in the access failure PLMN list.

In another possible implementation manner, the terminal further includes:

a reporting module, configured to determine whether the logged access failure PLMN list includes an RPLMN of the terminal when the terminal accesses a second cell, and if yes, report indication information that indicates the logged data is available or a logging report to the second cell; or determine whether the logged access failure PLMN list includes an identifier of a PPLMN of a second cell, and if yes, report indication information that indicates the logged data is available or a logging report to the second cell; or determine whether the logged access failure PLMN list is the same as any item of a PLMN list broadcast by a second cell, and if yes, report indication information that indicates the logged data is available or a logging report to the second cell.

The second cell is a cell with which the terminal has established an RRC connection or a cell to which the terminal has been handed over.

In another aspect, a terminal is provided, where the terminal includes:

a processor, configured to establish an RRC connection with a first cell, and when failing to establish the RRC connection with the first cell, log an access failure PLMN list, where the access failure PLMN list includes a PLMN selected by the terminal and the first cell is a cell including the PLMN selected by the terminal; and a memory, configured to store the access failure PLMN list.

In a possible implementation manner, the access failure PLMN list logged by the processor further includes:

a first EPLMN corresponding to the PLMN selected by the terminal, where the first EPLMN is an EPLMN of the PLMN selected by the terminal before the RRC connection fails to be established; or a second EPLMN corresponding to the PLMN selected by the terminal, where the second EPLMN is an EPLMN of the PLMN selected by the terminal undergoing an EPLMN update after the terminal successfully accessing the first cell again.

In another possible implementation manner, the access failure PLMN list merely includes the PLMN selected by the terminal, and the terminal further includes:

a wireless transceiver, configured to receive indication information, where the indication information is used to indicate that the PLMN selected by the terminal is logged when an access failure occurs; and the processor is specifically configured to establish the RRC connection with the first cell, and when failing to establish the RRC connection with the first cell, log, according the indication information, the PLMN selected by the terminal in the access failure PLMN list.

In another possible implementation manner, the processor is further configured to determine whether the logged access failure PLMN list includes an RPLMN of the terminal when the terminal accesses a second cell, and when a determination result obtained by the processor is yes, the wireless transceiver is further used to report indication information indicates that the logged data is available or a logging report to the second cell; or the processor is further configured to determine whether the logged access failure PLMN list includes an identifier of a PPLMN of a second cell; when a determination result obtained by the processor is yes, the wireless transceiver is further used to report indication information that indicates the logged data is available or a logging report to the second cell; or the processor is further configured to determine whether the logged access failure PLMN list is the same as any item of a PLMN list broadcast by a second cell; when a determination result obtained by the processor is yes, the wireless transceiver is further used to report indication information that indicates the logged data is available or a logging report to the second cell.

According to the technical solution described above, in this embodiment, after the terminal fails to establish an RRC connection with the cell containing the PLMN selected by the terminal, that is, after the terminal fails to access the cell including the selected PLMN, the selected PLMN is logged in the access failure PLMN list; in this manner, it may be achieved that the access failure PLMN list includes the selected PLMN rather than the RPLMN at the time the UE fails to perform accessing, thereby avoiding problems, such as the logging error or reporting error incurred by that the PLMN selected when the access failure occurs is inconsistent with the logged RPLMN, achieving the accuracy of the logging, and therefore reporting to the cell of the correct PLMN.

BRIEF DESCRIPTION OF DRAWINGS

To illustrate the technical solutions according to various embodiments of the present invention more clearly, the accompanying drawings for describing the embodiments are introduced briefly in the following. Apparently, the accompanying drawings in the following description are only some embodiments of the present invention, and persons of ordinary skill in the art may derive other drawings from the accompanying drawings without creative efforts.

DESCRIPTION OF EMBODIMENTS

In order to make the objectives, technical solutions, and advantages of various embodiments of the present invention more comprehensible, the technical solutions according to embodiments of the present invention are clearly and completely described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
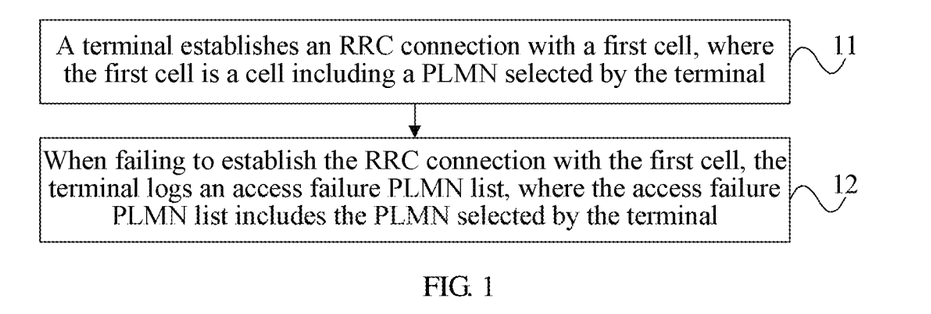
FIG. 1 is a schematic flow chart of an embodiment of a processing method after an access failure of a terminal according to an embodiment of the present invention.

FIG. 1 is a schematic flow chart of an embodiment of a processing method after an access failure of a terminal according to an embodiment of the present invention, which includes:

Step 11: A terminal establishes an RRC connection with a first cell, where the first cell is a cell including a PLMN selected by the terminal.

In different systems, the terminal may have different names, for example, the terminal is a UE, a mobile station (Mobile Station, MS), and the like. In this embodiment of the present invention, the terminal is, for example, a UE.

After an inter-PLMN movement, the UE may reselect a new PLMN and initiate an RRC connection with a cell including the PLMN, so as to access the cell of the PLMN.

Step 12: When failing to establish the RRC connection with the first cell, the terminal logs an access failure PLMN list, where the access failure PLMN list includes the PLMN selected by the terminal.

In the embodiment of the present invention, the access failure PLMN list may merely include one PLMN or include at least two PLMNs. When merely one PLMN is included, the access failure PLMN list may be also called an access failure PLMN.

In the prior art, after the RRC connection fails to be established, the logged access failure PLMN is an RPLMN when the UE fails to establish the RRC connection; different from the prior art, in the embodiment of the present invention, the access failure PLMN is a PLMN selected when the UE fails to establish the RRC connection.

In addition, when multiple PLMNs share a network cell, a PLMN may be designated as a primary PLMN (Primary PLMN, PPLMN), and the other PLMNs are secondary PLMNs. In a shared network, for network optimization, maintenance and optimization are mainly performed by a PPLMN operator, so that an access failure report may be submitted to the network of the PPLMN and the UE may also log the PPLMN when the RRC connection fails to be established.

Figure 2:
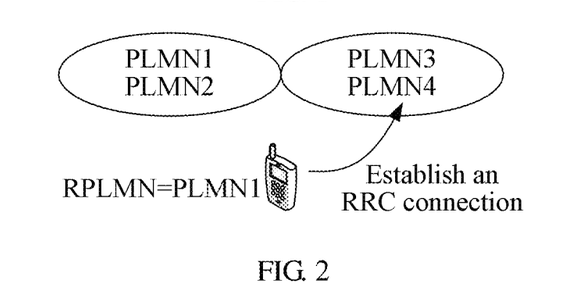
FIG. 2 is a schematic diagram of movement of a UE according to an embodiment of the present invention.

Referring to FIG. 2, it is assumed that a UE moves from a shared network cell of a PLMN1 and a PLMN2 to a shared network cell of a PLMN3 and a PLMN4, the UE selects the PLMN4 and chooses to camp on a cell under the PLMN4, and the PLMN3 is a PPLMN of the shared cell of the PLMN3 and the PLMN4 which the UE chooses to camp on. When the UE camps on the shared network cell of the PLMN1 and the PLMN2, RPLMN=PLMN1.

Figure 3:
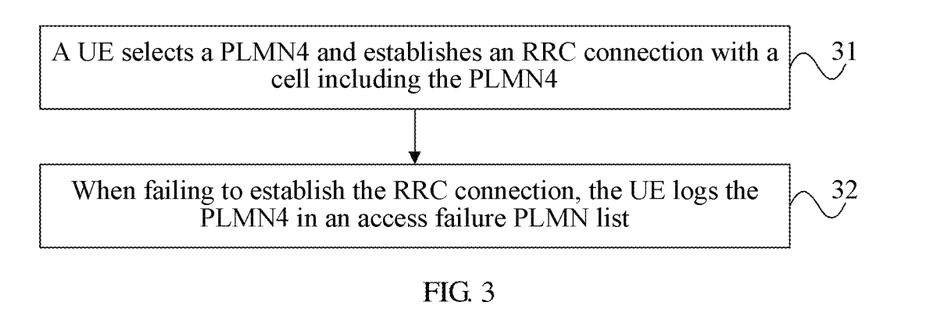
FIG. 3 is a schematic flow chart of another embodiment of a processing method after an access failure of a terminal according to an embodiment of the present invention.

When the UE fails to establish an RRC connection with the shared network cell of the PLMN3 and the PLMN4, taking a system shown in FIG. 2 as an example, a logged access failure PLMN list may include the following:

Referring to FIG. 3, FIG. 3 is a schematic flow chart of another embodiment of a processing method after an access failure of a terminal according to an embodiment of the present invention. In this embodiment, a logged access failure PLMN list merely includes a PLMN selected by a UE. This embodiment includes:

Step 31: The UE selects a PLMN4 and establishes an RRC connection with a cell including the PLMN4.

Step 32: When failing to establish the RRC connection, the UE logs the PLMN4 in the access failure PLMN list.

At this time, the access failure PLMN may be also called a PLMN selected by the UE.

Figure 4:
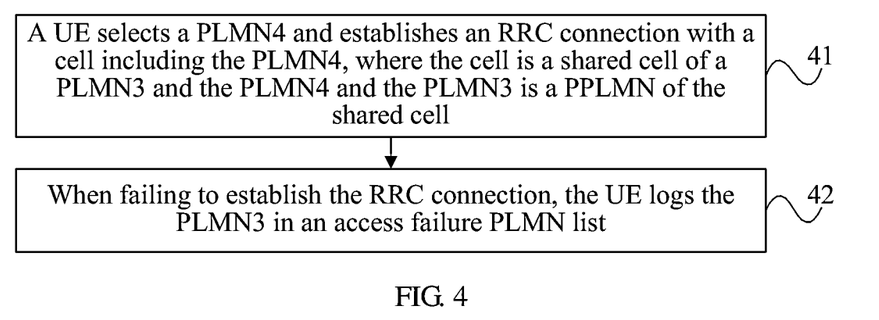
FIG. 4 is a schematic flow chart of another embodiment of a processing method after an access failure of a terminal according to an embodiment of the present invention.

Referring to FIG. 4, FIG. 4 is a schematic flow chart of another embodiment of a processing method after an access failure of a terminal according to an embodiment of the present invention. In this embodiment, a logged access failure PLMN list merely includes a PLMN, and the PLMN is a PPLMN of a cell which the terminal fails to access. This embodiment includes:

Step 41: The UE selects a PLMN4 and establishes an RRC connection with a cell including the PLMN4, where the cell is a shared cell of a PLMN3 and the PLMN4 and the PLMN3 is a PPLMN of the shared cell.

Step 42: When failing to establish the RRC connection, the UE logs the PLMN3 in the access failure PLMN list.

At this time, the access failure PLMN may be also called the PPLMN of an access failure cell.

Figure 5:
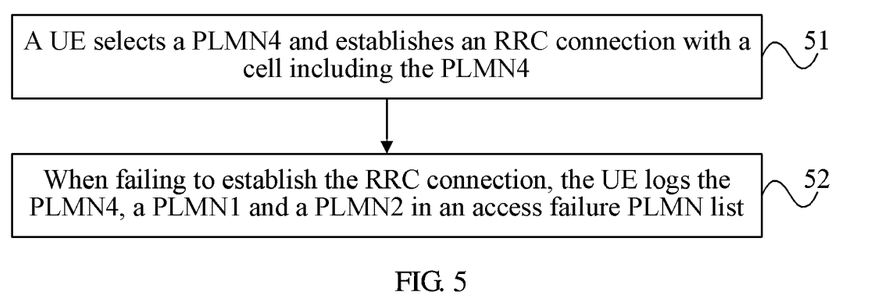
FIG. 5 is a schematic flow chart of another embodiment of a processing method after an access failure of a terminal according to an embodiment of the present invention.

Referring to FIG. 5, FIG. 5 is a schematic flow chart of another embodiment of a processing method after an access failure of a terminal according to an embodiment of the present invention. In this embodiment, a logged access failure PLMN list includes a PLMN selected by a terminal and a first EPLMN corresponding to the PLMN selected by the terminal, where the first EPLMN is an EPLMN of the PLMN selected by the terminal before the RRC connection fails to be established. This embodiment includes:

Step 51: A UE selects a PLMN4 and establishes an RRC connection with a cell including the PLMN4.

In addition, it is assumed that an EPLMN list when the UE camps on a shared network cell of a PLMN1 and a PLMN2 includes the PLMN1, the PLMN2, and the PLMN4.

Step 52: When failing to establish the RRC connection, the UE logs the PLMN4, the PLMN1, and the PLMN2 in the access failure PLMN list.

Figure 6:
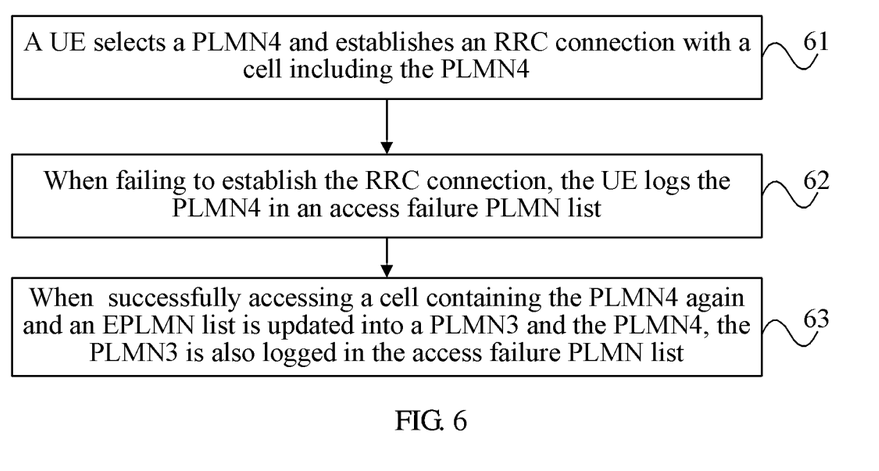
FIG. 6 is a schematic flow chart of another embodiment of a processing method after an access failure of a terminal according to an embodiment of the present invention.

Referring to FIG. 6, FIG. 6 is a schematic flow chart of another embodiment of a processing method after an access failure of a terminal according to an embodiment of the present invention. In this embodiment, a logged access failure PLMN list includes a PLMN selected by a terminal and a second EPLMN corresponding to the PLMN selected by the terminal, where the second EPLMN is an EPLMN of the PLMN selected by the terminal undergoing an EPLMN update after the terminal successfully accesses the first cell again. This embodiment includes:

Step 61: A UE selects a PLMN4 and establishes an RRC connection with a cell including the PLMN4.

In addition, it is assumed that an EPLMN list when the UE camps on a shared network cell of a PLMN1 and a PLMN2 includes the PLMN1 and the PLMN2.

Step 62: When failing to establish the RRC connection, the UE logs the PLMN4 in the access failure PLMN list.

Step 63: After the UE again successfully accesses a cell including the PLMN4 and when the EPLMN list is updated into a PLMN3 and the PLMN4, the PLMN3 is also logged in the access failure PLMN list, that is, the access failure PLMN list includes the PLMN3 and the PLMN4.

In this embodiment, after the terminal fails to establish an RRC connection with the cell including the PLMN selected by the terminal, that is, after the terminal fails to access the cell including the selected PLMN, the selected PLMN is logged in the access failure PLMN list; in this manner, it may be achieved that the access failure PLMN list includes the selected PLMN rather than the RPLMN at the time the UE fails to perform accessing, thereby avoiding problems, such as the logging error or reporting error, incurred by that the PLMN selected when the access failure occurs is inconsistent with the logged RPLMN, achieving the accuracy of the logging, and therefore reporting to the cell of the correct PLMN.

Specifically, what is logged can be predefined; specifically, in a scenario in which the access failure PLMN is the selected PLMN or the PPLMN of the access failure cell, in the embodiment of the present invention, it may be predefined that the selected PLMN is logged or the PPLMN of the access failure cell is logged, or according to indication information, the access failure PLMN may be logged as the PLMN selected by the UE or the PPLMN of the access failure cell.

Figure 7:
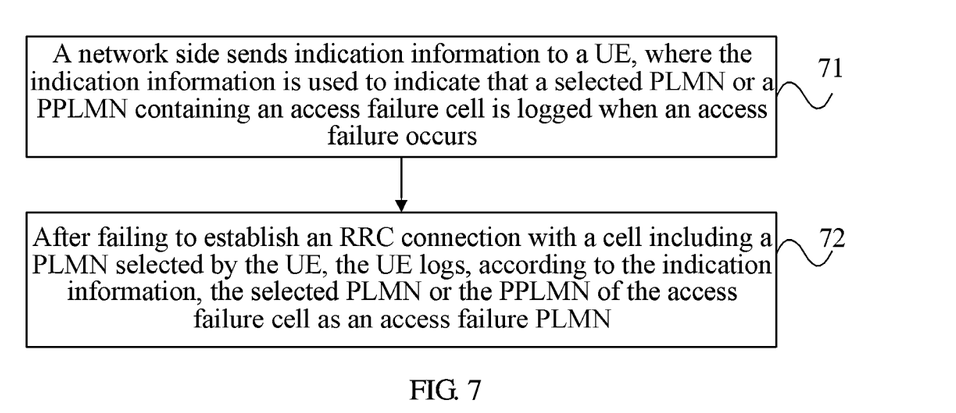
FIG. 7 is a schematic flow chart of another embodiment of a processing method after an access failure of a terminal according to an embodiment of the present invention.

Referring to FIG. 7, FIG. 7 is a schematic flow chart of another embodiment of a processing method after an access failure of a terminal according to an embodiment of the present invention, which includes:

Step 71: A network side sends indication information to a UE, where the indication information is used to indicate that a selected PLMN or a PPLMN including an access failure cell is logged when an access failure occurs.

Step 72: After failing to establish an RRC connection with a cell including the PLMN selected by the UE, the UE logs, according to the indication information, the selected PLMN or the PPLMN of the access failure cell as an access failure PLMN.

The indication information may be contained in a broadcast message, and the indication information may be 1 bit and indicates whether the PLMN selected when the access failure occurs or the PPLMN is logged, for example, when the indication information=1, the PLMN selected when the access failure occurs is logged, and specifically, a PLMN4, for example, is logged; when the indication information=0, the PPLMN is logged, and specifically, a PLMN3, for example, is logged.

This embodiment is described through an example in which the indication information is sent by the network side to the UE; optionally, the obtaining, by the UE, the indication information may include: obtaining, by the UE, the indication information according to a predefined manner, and for example, it is predefined that the selected PLMN or the PPLMN of the access failure cell is logged.

In this embodiment, different logs can be flexibly achieved according to the indication information, thereby improving diversity of the application.

After the access failure PLMN list is logged, corresponding reporting may be performed accordingly.

Figure 8:
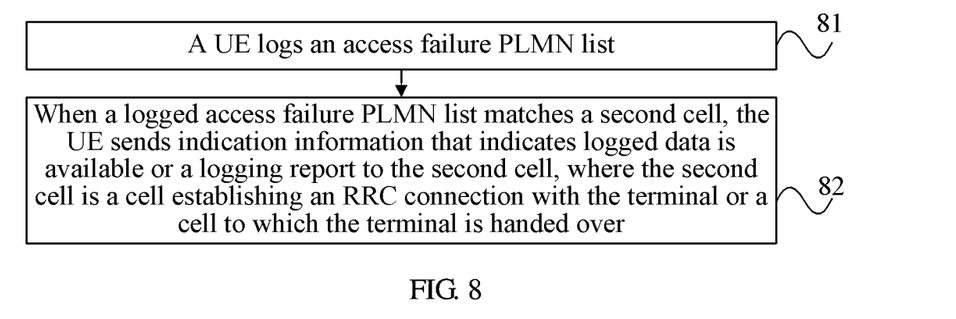
FIG. 8 is a schematic flow chart of another embodiment of a processing method after an access failure of a terminal according to an embodiment of the present invention.

FIG. 8 is a schematic flow chart of another embodiment of a processing method after an access failure of a terminal according to an embodiment of the present invention, which includes:

Step 81: A UE logs an access failure PLMN list.

As described in the above embodiments, the access failure PLMN list may include:

a selected PLMN or a PPLMN of an access failure cell; or a selected PLMN and a first EPLMN corresponding to the selected PLMN, where the first EPLMN is an EPLMN of the selected PLMN before the RRC connection fails to be established; or a selected PLMN and a second EPLMN corresponding to the selected PLMN, where the second EPLMN is an EPLMN of the PLMN selected by the terminal undergoing an EPLMN update after the terminal successfully accessing the first cell again.

Step 82: When a logged access failure PLMN list matches a second cell, the UE sends indication information that indicates logged data is available or a logging report to the second cell, where the second cell is a cell that has established an RRC connection with the terminal or a cell to which the terminal has been handed over.

The second cell may be the same as or different from the first cell.

For example, in a logged MDT scenario, the above determination on matching is performed first, before the UE sends the indication information that indicates MDT log data is available or before the UE sends the logged MDT log data to the network side after receiving a request message of the network side; only when it is determined to be matching, the above indication information that indicates the MDT log data is available or the logged MDT log data is sent.

For another example, in an RLF or HOF scenario, the above determination on matching is performed first, before the UE sends indication information that indicates an RLF or HOF logging report is available, or before the UE sends the RLF or HOF logging report to the network side after receiving a request message of the network side; when it is determined to be matching, the above indication information that indicates the RLF or HOF logging report is available or the RLF or HOF logging report is sent.

No matter in the logged MDT scenario or the RLF or HOF scenario, the following manners may be used to perform the determination on matching.

It is determined whether the logged access failure PLMN list includes an RPLMN of the UE when the UE accesses the second cell; if yes, it is determined to be matching; otherwise, it is determined to be non-matching.

For example, if the logged access failure PLMN list includes the PLMN4, when the RPLMN of the UE is the PLMN4 when the UE accesses the second cell, it is determined to be matching.

Or, it is determined whether the logged access failure PLMN list includes a PPLMN of the second cell; if yes, it is determined to be matching; otherwise, it is determined to be non-matching.

For example, if the logged access failure PLMN list includes a PLMN3, when a PPLMN of the second cell is the PLMN3, it is determined to be matching.

Or, it is determined whether the logged access failure PLMN list is the same as any item of a PLMN list broadcast by the second cell; if yes, it is determined to be matching; otherwise, it is determined to be non-matching.

For example, if the logged access failure PLMN list includes the PLMN4, when the PLMN list broadcast by the currently accessed second cell includes the PLMN3 and the PLMN4, it is determined to be matching.

During the determination process described above, when the UE camps on a cell, the UE may receive the PLMN list broadcast by the cell, and a first PLMN in the PLMN list is usually the PPLMN; therefore, the UE may compare the logged access failure PLMN list and the broadcast PLMN list to perform the determination described above. Or, after successfully accessing a cell, the UE may obtain a PLMN where the cell is located, and the UE may update the RPLMN with the RPLMN of the currently accessed cell and then compares the RPLMN of the currently accessed cell with the logged access failure PLMN list to perform the corresponding determination described above.

The UE according to this embodiment performs the above determination before the reporting, so as to ensure that the log is sent to a cell of a correct PLMN.

Figure 9:
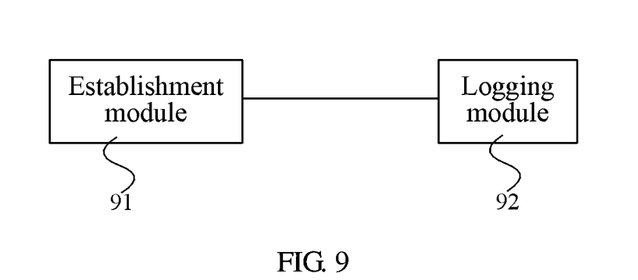
FIG. 9 is a schematic structural diagram of an embodiment of a terminal according to an embodiment of the present invention.

FIG. 9 is a schematic structural diagram of an embodiment of a terminal according to an embodiment of the present invention. The terminal may be a device executing the method described above and the terminal includes an establishment module 91 and a logging module 92; the establishment module 91 is configured to establish an RRC connection with a first cell, where the first cell is a cell including a PLMN selected by the terminal; the logging module 92 is configured to log an access failure PLMN list when the RRC connection with the first cell fails to be established, where the access failure PLMN list includes the PLMN selected by the terminal.

Optionally, the access failure list logged by the logging module further includes:

a first EPLMN corresponding to the PLMN selected by the terminal, where the first EPLMN is an EPLMN of the PLMN selected by the terminal before the RRC connection fails to be established; or a second EPLMN corresponding to the PLMN selected by the terminal, where the second EPLMN is an EPLMN of the PLMN selected by the terminal undergoing an EPLMN update after the terminal successfully accessing the first cell again.

Optionally, the access failure PLMN list merely includes the PLMN selected by the terminal, and the terminal further includes an obtaining module, configured to obtain indication information, where the indication information is used to indicate that the PLMN selected by the terminal is logged when an access failure occurs; and the logging module is specifically configured to log, according to the indication information, the PLMN selected by the terminal in the access failure PLMN list.

Optionally, the terminal further includes:

a reporting module, configured to determine whether the logged access failure PLMN list includes an RPLMN of the terminal when the terminal accesses a second cell, and if yes, report indication information that indicates the logged data is available or a logging report to the second cell; or determine whether the logged access failure PLMN list includes an identifier of a PPLMN of the second cell, and if yes, report indication information that indicates the logged data is available or a logging report to the second cell; or determine whether the logged access failure PLMN list is the same as any item of a PLMN list broadcast by the second cell, and if yes, report indication information that indicates the logged data is available or a logging report to the second cell.

The second cell is a cell with which the terminal has established an RRC connection or a cell to which the terminal has been handed over.

In this embodiment, after the terminal fails to establish an RRC connection with the cell including the PLMN selected by the terminal, that is, after the terminal fails to access the cell including the selected PLMN, the selected PLMN is logged in the access failure PLMN list; in this manner, it may be achieved that the access failure PLMN list includes the selected PLMN rather than the RPLMN at the time the UE fails to perform accessing, thereby avoiding problems, such as the logging error or reporting error, incurred by that the PLMN selected when the access failure occurs is inconsistent with the logged RPLMN, achieving the accuracy of the logging, and therefore reporting to the cell of the correct PLMN.

Figure 10:
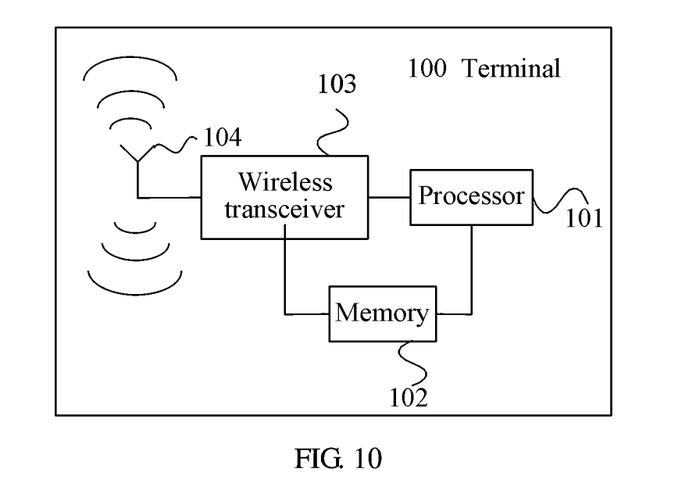
FIG. 10 is a schematic structural diagram of another embodiment of a terminal according to an embodiment of the present invention.

FIG. 10 is a schematic structural diagram of another embodiment of a terminal according to an embodiment of the present invention. The terminal 100 includes a processor 101 and a memory 102; the processor 101 is configured to establish an RRC connection with a first cell, and when failing to establish the RRC connection with the first cell, log an access failure PLMN list, where the access failure PLMN list includes a PLMN selected by the terminal and the first cell is a cell including the PLMN selected by the terminal; and the memory 102 is configured to store the access failure PLMN list.

Optionally, the access failure PLMN list logged by the processor further includes:

a first EPLMN corresponding to the PLMN selected by the terminal, where the first EPLMN is an EPLMN of the PLMN selected by the terminal before the RRC connection fails to be established; or a second EPLMN corresponding to the PLMN selected by the terminal, where the second EPLMN is an EPLMN of the PLMN selected by the terminal undergoing an EPLMN update after the terminal successfully accessing the first cell again.

Optionally, the access failure PLMN list merely includes the PLMN selected by the terminal, and the terminal further includes:

a wireless transceiver 103, configured to receive indication information, where the indication information is used to indicate that the PLMN selected by the terminal is logged when an access failure occurs.

The processor is specifically configured to establish the RRC connection with the first cell, and when failing to establish the RRC connection with the first cell, log, according the indication information, the PLMN selected by the terminal in the access failure PLMN list, where the indication information may be received by the wireless transceiver, or obtained as predefined.

Optionally, the processor is further configured to determine whether the logged access failure PLMN list includes an RPLMN of the terminal when the terminal accesses a second cell, and when a determination result obtained by the processor is yes, the wireless transceiver is further used to report indication information that indicates the logged data is available or a logging report to the second cell; or the processor is further configured to determine whether the logged access failure PLMN list includes an identifier of a PPLMN of the second cell; when a determination result obtained by the processor is yes, the wireless transceiver is further used to report the indication information that indicates the logged data is available or the logging report to the second cell; or the processor is further configured to determine whether the logged access failure PLMN list is the same as any item of a PLMN list broadcast by the second cell; when a determination result obtained by the processor is yes, the wireless transceiver is further used to report the indication information that indicates the logged data is available or the logging report to the second cell.

The wireless transceiver may receive and transmit a radio signal through one or more antennas 104. The processor may be implemented through a logic integrated circuit.

In this embodiment, after the terminal fails to establish an RRC connection with the cell including the PLMN selected by the terminal, that is, after the terminal fails to access the cell including the selected PLMN, the selected PLMN is logged in the access failure PLMN list; in this manner, it may be achieved that the access failure PLMN list includes the selected PLMN rather than the RPLMN at the time the UE fails to perform accessing, thereby avoiding problems, such as the logging error or reporting error, incurred by that the PLMN selected when the access failure occurs is inconsistent with the logged RPLMN, achieving the accuracy of the logging, and therefore reporting to the cell of the correct PLMN.

Persons of ordinary skill in the art should understand that all or part of the steps of the method according to each embodiment of the present invention may be implemented by a program instructing relevant hardware. The program may be stored in a computer readable storage medium. When the program runs, the program executes the steps of the method according to each embodiment above. The storage medium may be any medium capable of storing program codes, such as a ROM, a RAM, a magnetic disk, or an optical disk.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications may be made to the technical solutions described in the embodiments, or equivalent replacements may be made to part or all of technical features in the technical solutions, as long as such modifications or replacements do not cause the essence of corresponding technical solutions to depart from the scope of the technical solutions of the present invention.

What is claimed is:

1. A method comprising:
   selecting, by a terminal, in response to moving from a first shared network cell of a first public land mobile network (PLMN) and a second PLMN to a second shared network cell of a third PLMN and a fourth PLMN, the fourth PLMN for the terminal to camp on the second shared network cell, wherein the fourth PLMN is not an RPLMN of the terminal or an equivalent public land mobile network (EPLMN) of an RPLMN of the terminal before moving to the second shared network cell, and wherein an equivalent PLMN (EPLMN) list includes the first PLMN and the second PLMN when the terminal camps on the first shared network cell;
   initiating, by the terminal, establishment of a radio resource control (RRC) connection with the second shared network cell;
   logging, by the terminal in response to a failure of the terminal to establish the RRC connection with the second shared network cell, the fourth PLMN in an access failure PLMN list, wherein the first PLMN, the second PLMN, and the fourth PLMN are each different PLMNs;
   establishing a connection to a third cell corresponding to the fourth PLMN;
      logging, by the terminal in response to successfully accessing the third cell and further in response to the EPLMN list being updated to include the third PLMN and the fourth PLMN, the third PLMN into the access failure PLMN list;
   and
      transmitting, by the terminal, to a network of the third cell measurement data associated with the failure of the terminal to establish to establish the RRC connection with the second shared network cell.

2. The method according to claim 1, wherein the method further comprises:
   obtaining, by the terminal, indication information, wherein the indication information indicates that an access failure PLMN is logged as the PLMN selected by the UE; and
   wherein the logging the fourth PLMN in the access failure PLMN list comprises:
      logging, by the terminal, according to the indication information, the fourth PLMN in the access failure PLMN list.

3. A terminal, comprising:
   a non-transitory processor-readable medium storing processor readable instructions; and
   a processor that executes the instructions stored in the non-transitory processor-readable medium, to cause the terminal to:
      select, in response to the terminal moving from a first shared network cell of a first public land mobile network (PLMN) and a second PLMN to a second shared network cell of a third PLMN and a fourth PLMN, the fourth PLMN for the terminal to camp on the second shared network cell, wherein the fourth PLMN is not an RPLMN of the terminal or an equivalent public land mobile network (EPLMN) of an RPLMN of the terminal before moving to the second shared network cell, and wherein an equivalent PLMN (EPLMN) list includes the first PLMN and the second PLMN when the terminal camps on the first shared network cell;
initiate establishment of a radio resource control (RRC) connection with the second shared network cell;
log the fourth PLMN in an access failure PLMN list in response to a failure of the terminal to establish the RRC connection with the second shared network cell, wherein the first PLMN, the second PLMN, and the fourth PLMN are each different PLMNs;
establish a connection to a third cell corresponding to the fourth PLMN;
log, in response to successfully accessing the third cell and further in response to the EPLMN list being updated to include the third PLMN and the fourth PLMN, the third PLMN into the access failure PLMN list; and
transmit, to a network of the third cell, measurement data associated with the failure of the terminal to establish the RRC connection with the second shared network cell.

4. The terminal according to claim 3, wherein the terminal further comprises:
a wireless transceiver, configured to receive indication information, wherein the indication information indicates that an access failure PLMN is logged as the PLMN selected by the UE; and
wherein the processor executes the instructions stored in the non-transitory processor-readable medium, log, according the indication information, the fourth PLMN in the access failure PLMN list in response to the terminal failing to establish the RRC connection with the second shared network cell.

5. A non-transitory, non-volatile computer storage medium having a program recorded thereon; wherein the program, when executed by a terminal, causes the terminal to execute a method comprising:
selecting, in response to the terminal moving from a first shared network cell of a first public land mobile network (PLMN) and a second PLMN to a second shared network cell of a third PLMN and a fourth PLMN, the fourth PLMN for the terminal to camp on the second shared network cell, wherein the fourth PLMN is not an RPLMN of the terminal or an equivalent public land mobile network (EPLMN) of an RPLMN of the terminal before moving to the second shared network cell, and wherein an equivalent PLMN (EPLMN) list includes the first PLMN and the second PLMN when the terminal camps on the first shared network cell;
initiating establishment of a radio resource control (RRC) connection with the second shared network cell;
logging the fourth PLMN in an access failure PLMN list in response to a failure of the terminal to establish the RRC connection with the second shared network cell, wherein the first PLMN, the second PLMN, and the fourth PLMN are each different PLMNs;
establishing a connection to a third cell corresponding to the fourth PLMN;
logging, by the terminal in response to successfully accessing the third cell and further in response to the EPLMN list being updated to include the third PLMN and the fourth PLMN, the third PLMN into the access failure PLMN list; and
transmitting, to a network of the third cell measurement data associated with the failure of the terminal to establish to establish the RRC connection with the second shared network cell.

* * * * *